June 20, 1939.                L. J. BAZZONI                2,162,795
                            GRINDING APPARATUS
                           Filed Aug. 14, 1936           2 Sheets-Sheet 1
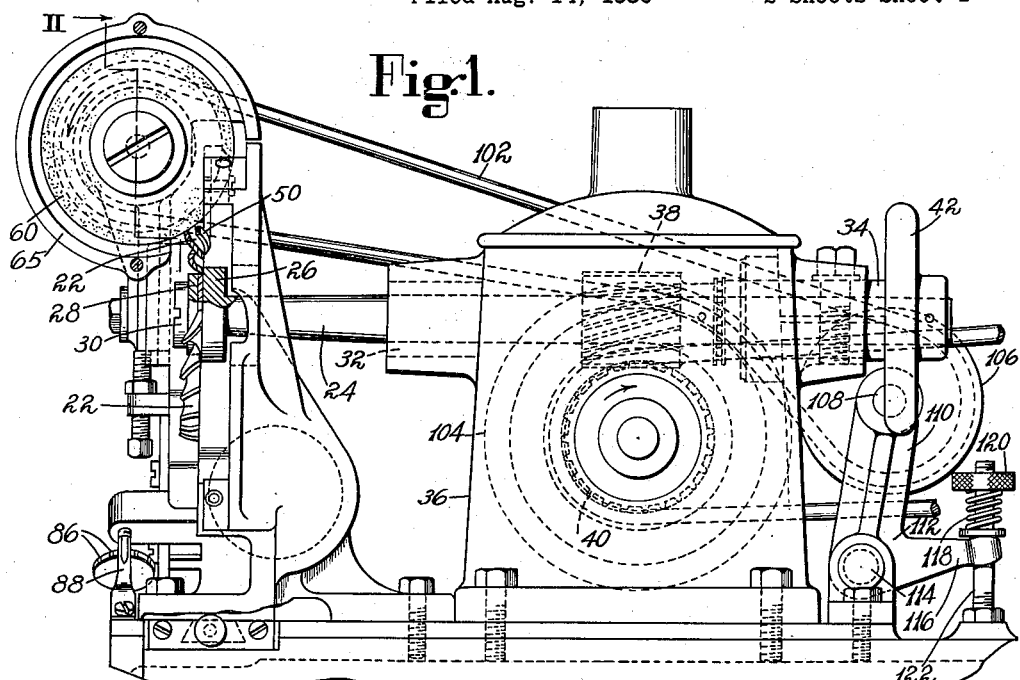
Fig. 1.
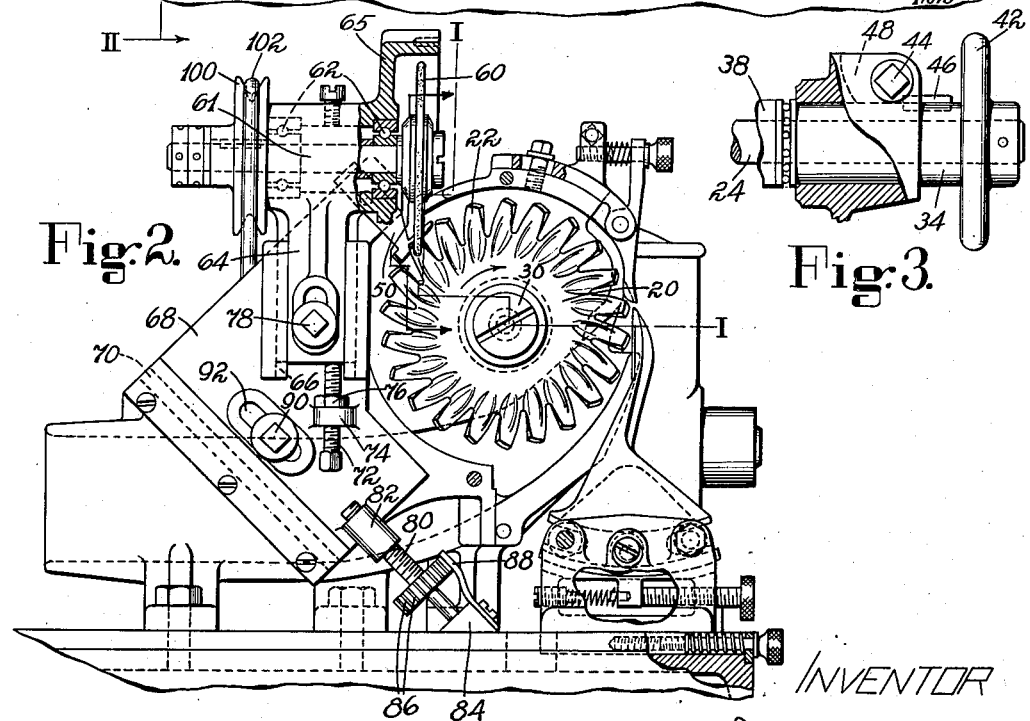
Fig. 2.                                                    Fig. 3.
INVENTOR
Lewis J. Bazzoni
By his Attorney,
Harlow M. Davis June 20, 1939.　　　　L. J. BAZZONI　　　　2,162,795
GRINDING APPARATUS
Filed Aug. 14, 1936　　　　2 Sheets-Sheet 2

INVENTOR
Lewis J. Bazzoni
By his Attorney,
Harlow M. Davis

Patented June 20, 1939

2,162,795

UNITED STATES PATENT OFFICE 2,162,795

GRINDING APPARATUS

Lewis J. Bazzoni, Swampscott, Mass., assignor to United Shoe Machinery Corporation, Paterson, N. J., a corporation of New Jersey Application August 14, 1936, Serial No. 96,086

6 Claims. (Cl. 51—225)

This invention relates to abrading machines and is herein illustrated as embodied in a machine for sharpening the cutting edges of sheet steel rotary toothed cutters having skewed teeth. Such cutters are an improvement on the solid toothed disk cutter illustrated and described in my United States Letters Patent No. 2,029,304, granted February 4, 1936, for a machine for trimming the covers of wood heels, preparatory to the attaching of the breast flap.

It has been found desirable to use the peripheral faces or ends of the teeth of the cutter for the above work and it is further desirable that the position of the contact of each tooth with the work shall progress across the face of the tooth. This is accomplished by the use of the skewed teeth. It is also preferable to have the edge of each tooth least acute (or with a small clearance angle) where it first engages the work, so as to bend the work into position to be cut, to have the edge more acute where the actual cutting takes place, and to have the angle of clearance progressively change so as to show no line of demarcation between the two portions of the tooth.

It is an object of the invention to produce a grinding machine for grinding a cutting edge on each of the teeth of cutters of the above-described character, with the teeth true, or in circumferential alinement, and which grinding machine may be incorporated in the trimming machine above mentioned, so that the cutter teeth may be sharpened and re-sharpened without removing the cutter from the machine and whereby the expense of a separate grinding machine may be saved.

It is a further object of the invention to produce a machine in which the cutter may be manipulated by the operator manually; first, to engage a templet; second, to keep a portion of a tooth in contact with the templet while the cutter is given a combined motion of rotation and longitudinal translation to grind the proper shape on the tooth; and third, to free the cutter from the templet preparatory to engaging the next tooth. By the use of such a machine, the advantage of the use of a templet for obtaining a given and accurate profile to the cutting edge of each tooth may be obtained without the added expense and complication of an automatic machine.

It is a further object to provide adjustments whereby the grinding wheel may be advanced toward the cutter in one direction to re-sharpen the teeth as required, and in another direction to compensate for its own wear, and whereby these adjustments may be manipulated together to modify the contour of the tooth, within certain limits, without changing the templet.

In view of the fact that the teeth are punched and shaped from sheet metal, slight inaccuracies may be introduced in their manufacture and it is a further object of the invention to prevent such inaccuracies from effecting the quality of the work done by the cutter, by arranging the templet to be engaged by each tooth in turn at a point closely adjacent to the cutting edge of the tooth as it is being ground and by also arranging the templet so that it is automatically re-adjusted as the length of the teeth is reduced by successive grinding operations.

With the above objects in view, the various features of the invention will be understood from the following description and the drawings referred to therein.

In these drawings

Fig. 1 is a front elevation of a trimming machine similar, in so far as its operating instrumentalities are concerned, to that of said United States patent, and showing the grinding device of the present invention incorporated therein with certain parts thereof shown in section (taken along the line I—I of Fig. 2);

Fig. 2 is an end view of the machine showing the grinding device with portions of the guard and mounting for the grinding wheel in section (taken along the line II—II of Fig. 1) and with other portions of the guard cut away in order better to show the relative positions of the wheel and the cutter;

Fig. 3 is a detailed view, partly in section, of one of the bushings in which the cutter shaft runs, and which bushing may be secured in the frame of the machine to permit the cutter to operate in trimming position or which bushing may be left free to permit longitudinal movement of the cutter and shaft, in addition to rotary movement, so that the cutter may be ground;

Figure 4:
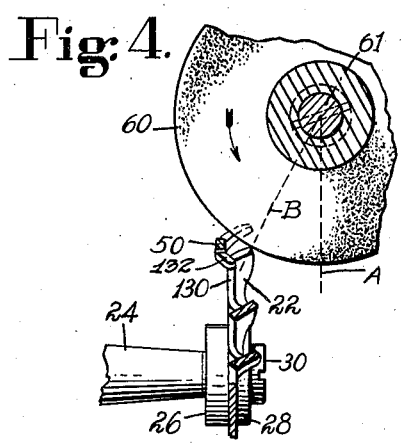
Figure 7:
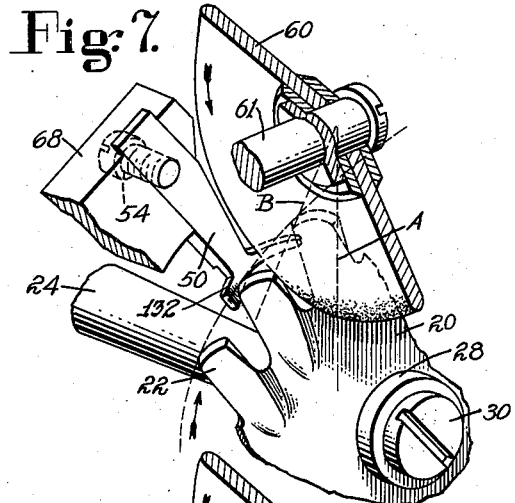
Figure 5:
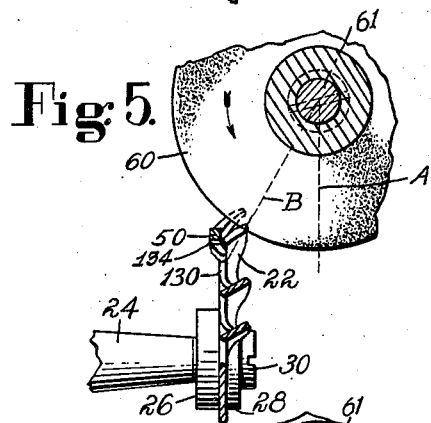
Figure 8:
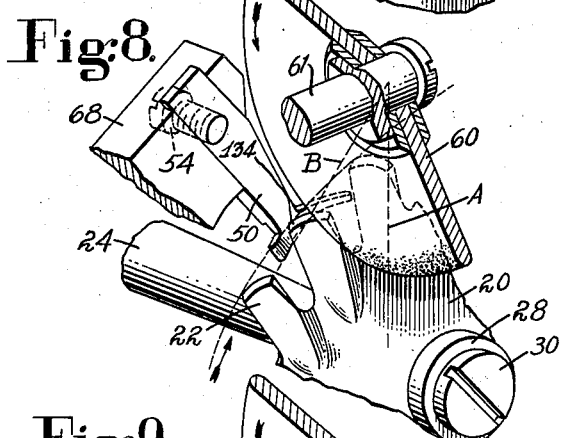
Figure 6:
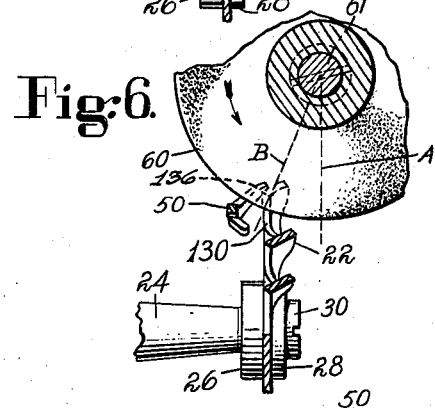
Figure 9:
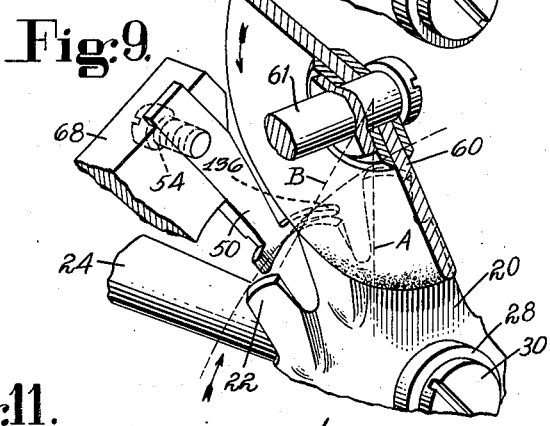
Figures 10, 11:
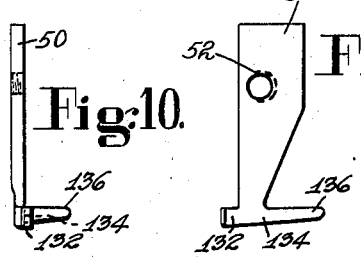
Figure 12:
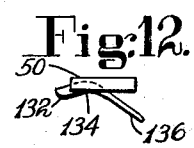

Figs. 4, 5, and 6 are rear elevations, partly in section (and taken on the broken line indicated by arrow heads in Fig. 2), of the grinding wheel, showing one tooth of the cutter in contact with a templet in three successive positions of the grinding operation and with other teeth broken away by said broken line;

Figs. 7, 8, and 9 are angular views of the grinding wheel, templet and portions of the cutter, corresponding respectively to the positions shown in Figs. 4, 5, and 6; and Figs. 10, 11, and 12 are respectively a side elevation, a front elevation and a plan view of the templet used to guide the cutter during the grinding operation.

The trimming machine shown herein is not the subject of the present invention and need not be described herein except to state that it is a development of that shown in my prior United States Patent No. 2,029,304, and that the cutter is made of sheet steel with skewed teeth, as previously described, instead of being of the solid toothed disk type illustrated in said patent.

The new sheet metal type of cutter is indicated at 20 and is provided with skewed teeth 22. The cutter is mounted on a cutter shaft 24 and is secured thereto, for rotation therewith, between a collar 26 and washer 28 by means of a screw 30. The cutter shaft 24 is mounted for rotation in two bushings 32 and 34 held in bosses in the machine frame 36. Fixed to the shaft 24 is a helical gear 38 by which it is driven, through another helical gear 40, from a source of power (not shown), during the normal operation of the machine in trimming, and from which drive it may be readily disconnected when it is necessary to grind the cutter. For manipulating the shaft and cutter while the latter is being ground, a hand wheel 42 is also secured to the shaft 24. The hub of the gear 38 abuts one end of the bushing 34, through a thrust washer, and the hand wheel 42 abuts the other end of said bushing 34 (with a running fit against the bushing).

The bushing 34 is secured in a boss in the machine frame, in the position shown in Fig. 3, by a clamp screw 44 during the trimming operation and the shaft is prevented from longitudinal movement by the abutting members 38 and 42.

When the cutter is to be ground, the clamp screw 44 is loosened so that the bushing 34 may be moved longitudinally in its boss and permit corresponding movement of the shaft and cutter, as will be hereinafter explained. The bushing 34 is prevented from rotating in the boss by a key 46 which engages a slot 48 in the boss, but the shaft 24 remains free to be rotated in the bushing.

When the clamp screw 44 is loosened, so that the cutter may be ground, the cutter shaft 24 and the cutter 20 are moved manually by the operator by means of the hand wheel 42, both rotatively and longitudinally, the bushing 34 partaking of the longitudinal movement of the shaft, as already explained. The manual movement of combined rotation and longitudinal translation that is given to the cutter and shaft to secure the desired profile and bevel on the ends or peripheral faces of the teeth and to bring the profiles of all of the teeth into circumferential alinement is controlled by a templet having a shank 50. The shank is provided with a tapped hole 52 and is secured in operative position by a screw 54 passing through a part of the machine and into said hole 52. The templet has a bent shape, as best shown in Figs. 10, 11 and 12, and it contacts and partially surrounds a tooth during a grinding operation. The shape, mounting and operation of this templet will be described more fully later.

The abrading means for sharpening the cutter consists of a thin grinding wheel 60 mounted on a shaft 61 running in ball bearings 62 and carried by a vertically adjustable slide 64. The slide has a wheel guard 65 integral therewith. This slide 64 is carried by a dovetailed slot 66 in another slide 68. The slide 68 is mounted for adjustment, at substantially 45° to the vertical, in a dovetailed slot 70 in the frame of the machine.

In order to adjust the grinding wheel vertically toward the cutter to compensate for wear of the wheel, the slide 64 may be lowered by lowering an adjusting screw 72 which is tapped through a lug 74 projecting from the slide 68, and against the end of which screw the bottom of the slide 64 rests. The adjusting screw is then locked in position by the check nut 76 and the slide 64 may then be clamped in adjusted position to the slide 68 by a clamping screw 78, passing through a slot in the slide 64 and tapped into the slide 68, to secure a rigid mounting for the wheel.

The grinding wheel may be moved substantially radially to the cutter to compensate for wear of the cutter, as it becomes dull, and to bring the wheel into grinding contact with the cutter, by means of an adjusting screw 80 which is tapped into a lug 82 projecting from the angularly adjustable slide 68. The lower end of the adjusting screw 80 rests against a fixed abutment 84 on the base of the machine and in order to secure a predetermined adjustment of the wheel, the head of the adjusting screw is provided with notches 86 into one of which a flat spring 88 enters to secure the screw in adjusted position. These notches serve as index marks so that the operator may know the amount that is to be ground away. Before this adjustment of the slide 68 can be made, a clamp screw 90 which passes through a slot 92 in the slide 68 and is tapped into the frame of the machine, must first be loosened. After the adjustment is made, the clamp screw 90 must be tightened to secure a rigid mounting of the wheel with respect to the cutter.

In Fig. 2, the grinding wheel is shown in contact with the cutter substantially on a radius parallel to the direction of movement of the slide 68. If the grinding wheel is raised from the position shown, by adjusting the slide 64 upwardly and the slide 68 is then readjusted to bring the wheel in contact with the cutter, the grinding contact will be above said radius. On the other hand, the slides may be adjusted to bring the point of grinding contact below said radius. Within limits, such a change in the position of the grinding contact affects a change in the profile of the tooth, and of the bevel of its clearance face, without the necessity of changing the shape of the templet.

The grinding wheel is driven by means of a pulley 100 secured to the grinding wheel shaft 61. The pulley is driven by a belt 102 which passes over a driving pulley 104 and a belt tightening pulley 106. The belt tightening pulley 106 is mounted on a short shaft 108 secured to the outer end of an arm 110 of a bell crank lever 112. This lever is pivoted at 114 and its other arm 116 is pressed downwardly by a spring 118, to provide a yielding tension on the belt. To provide an adjustment for this tension, the spring 118 may be adjustably tensioned by means of a thumb nut 120 threaded on an upright stud 122, which, in turn, is threaded into the base of the machine.

The manual movement of the cutter 20, by means of the hand wheel 42 and shaft 24, after the clamp screw 44 has been loosened to permit free movement of the bushing 34 in its boss, and the control of the movement by means of the templet, will now be described.

The shape of the templet, which is constructed on the end of the shank 50, is best shown in Figs. 10, 11 and 12. It has a bent shape arranged to contact and partially to surround a tooth during a grinding operation and, preferably, the actual tooth that is being ground. The bent shape consists of an end portion 132, an intermediate portion 134 and an opposite end portion 136. The portions 132 and 136 may be either straight or slightly curved and they make an obtuse angle with each other. These portions are connected by the intermediate portion 134, which is concave and which merges into the end portions 132 and 136. This shape may be termed "generally concave" and is referred to as such in the appended claims. The shapes, relative proportions and angular relations of the three portions may be varied to produce a desired shape on the ends of the teeth with suitable accompanying bevels. The illustrated templet, however, is suitable for grinding the teeth of the illustrated cutter to be used for the purpose heretofore mentioned.

For grinding each tooth, the cutter 20 and shaft 24 are turned and moved longitudinally to the left (Fig. 1), clearing the templet, then rotated clockwise (as viewed in Fig. 2). Considering now Figs. 4 to 9, inclusive, the cutter is then moved slightly to the left to bring the back edge 130 of the tooth into contact with the end portion 132 (Figs. 4 and 7) of the templet. Manual pressure is then maintained by the operator, both rotatively and longitudinally, to keep the tooth in contact with the templet and cause the tooth to travel along the templet as the tooth is being ground. The beginning of the grinding movement is already shown in Figs. 4 and 7. The cutter then moves longitudinally to the right under said clockwise movement by the operator, until the point of contact is at 134, this position being shown in Figs. 5 and 8. Continued clockwise movement then causes the templet to move the cutter to the right in Figs. 6 and 9 and this brings the front of the tooth into contact with the straight face 136 of the templet, with which face the tooth is then parallel. The tooth then slides along in parallel relation to and in contact with the face of the templet, the cutter continuing to move to the right in Figs. 6 and 9 until the final position shown in Figs. 6 and 9 is reached and the grinding of that tooth is finished. The cutter is then retracted manually, and reversely, along the above path until that tooth is freed from contact with the templet, when the cutter may be advanced manually to grind the next tooth in the above-described manner.

The above assumes that the grinding wheel has been positioned to remove sufficient stock to give a sharp edge to the cutter teeth. For each successive grinding, it is usually sufficient to retract the adjusting screw 80 from one notch 86 to the next.

It will be seen from a study of Figs. 4, 5 and 6, why a profile of a shape suitable for the class of work performed by the above-described trimming machine, with a gradually changing bevel, is given to the teeth. In each of these views is shown a vertical dash line "A" passing through the center of the grinding wheel and a similar line "B" which passes through this center and the point of grinding contact. (For convenience, these lines are indicated on the angular views, Figs. 7, 8 and 9). As the grinding progresses, from the position shown in Fig. 4 to that shown in Fig. 5, the line "B" rises (due to the movement of the cutter to the left in these views) and the grinding contact becomes farther away from the center of the cutter. The tooth is therefore longer at its position than at the beginning. As the grinding is finished, or when the position shown in Fig. 6 is reached, the line "B" has dropped (due to the fact that the cutter is then in the extreme right hand position, as viewed in this figure and the tooth is therefore shorter. The profile of the tooth is accordingly curved, with the high point at the position shown in Fig. 5. By changing the shape of the templet, it is obvious that other profile shapes may be obtained, as desired. It should be noted, however, that the contour of the cutting edge of each tooth is geometrically dissimilar to the contour of the templet but is coordinated therewith.

It will be noted that, as the line "B" rises, the clearance angle, or the acuteness of the cutting edge, increases progressively in the manner heretofore described as desirable.

As previously pointed out, it is desirable to have the templet make contact with the tooth being ground as closely as possible to the cutting edge. This is to be clearly seen in the drawings. It should be noted, however, that this relative position is automatically maintained as the teeth are shortened by grinding, because the templet is secured, by the screw 54, fixedly in a groove in the slide 68, by which slide the grinding wheel is made to approach the cutter as the teeth become worn down. Thus the grinding wheel and the templet both move in the same direction and to the same extent, to compensate for the wearing down of the teeth of the cutter.

Having thus described the invention, what I claim as new and desire to secure by Letters Patent of the United States is:

1. A grinding device having, in combination, a rotary grinding wheel, a rotary shaft upon which the wheel is mounted, a tooth cutter, a shaft upon which the cutter is fixed, the latter shaft and cutter being mounted for both rotary and longitudinal movement, said two shafts being at substantially right angles to each other but in offset planes, and means for controlling the movement of the wheel and cutter relatively to each other when moved with a manual movement of combined rotation and longitudinal translation while in grinding contact to cause the point of grinding contact to progress along the circumference of the wheel relatively to a fixed position and, at the same time, to progress along the peripheral face of the tooth to grind a profiled edge thereon with a progressively changing bevel.

2. A device for grinding cutters of the rotary type having, in combination, a rotary grinding wheel, a toothed cutter, a shaft upon which the cutter is fixed, said shaft and cutter being mounted for both rotary and longitudinal movement, a templet for controlling said rotary and longitudinal movement, means for adjusting the grinding wheel relatively to the cutter and into grinding contact with a tooth of the cutter, and means whereby said templet is automatically adjusted in the same direction and to the same extent as the grinding wheel so that the relation of the templet to the end or peripheral face of each tooth, at the grinding position, remains unchanged after the teeth have become shortened by repeated grinding.

3. A device for grinding cutters of the rotary type having, in combination, a rotary grinding wheel, a toothed cutter, a shaft upon which the cutter is fixed, said shaft and cutter being mounted for both rotary and longitudinal movement, a templet against which portions near the end of each tooth of the cutter may be brought into contact manually one at a time and which contact may be maintained by a manual movement of combined rotation and longitudinal translation, and means for adjusting the grinding wheel in a direction substantially radially of the cutter and into grinding contact with a tooth of the cutter, said templet being mounted on said means and being adjustable therewith, whereby the relation of the templet to the end or peripheral face of each tooth, at the grinding position, automatically remains unchanged after the teeth have become shortened by repeated grinding.

4. A device for grinding cutters of the rotary type having, in combination, a rotary grinding wheel, a toothed cutter, a shaft upon which the cutter is fixed, said shaft and cutter being mounted for both rotary and longitudinal movement, a templet against which each tooth of the cutter may be brought into contact manually one at a time and which contact may be maintained by a manual movement of combined rotation and longitudinal translation, and adjustable slide for carrying the grinding wheel, a second adjustable slide upon which the first-mentioned slide is mounted, and means for adjusting said slides in angularly related directions to compensate for the wear of both the wheel and the cutter.

5. A device for grinding cutters of the rotary type having, in combination, a rotary grinding wheel, a toothed cutter, a shaft upon which the cutter is fixed, said shaft and cutter being mounted for both rotary and longitudinal movement, a templet against which each tooth of the cutter may be brought into contact manually one at a time and which contact may be maintained by a manual movement of combined rotation and longitudinal translation, an adjustable slide for carrying the grinding wheel, a second adjustable slide upon which the first-mentioned slide is mounted, and means for adjusting said slides one in a direction substantially radially of the cutter and the other at an angle to said direction, to modify, within limits, the profile, otherwise predetermined by the templet, on each tooth.

6. The method of forming a cutting edge of predetermined profile on the peripheral faces of each of the teeth of a toothed cutter and bringing said edges into circumferential alignment, which consists in operating a grinding device in contact with one of said peripheral faces and manually moving the cutter both rotatively about and longitudinally along the axis of the cutter to grind said face while in guiding contact with a generally concave templet partially surrounding a tooth, continuing manual movement of the cutter to cause disengagement of said contacts and re-engagement with a following tooth and so on until all teeth have been ground to an edge having a predetermined profile and having a predetermined length.

LEWIS J. BAZZONI.